US012101861B2

(12) United States Patent
Kim

(10) Patent No.: US 12,101,861 B2
(45) Date of Patent: Sep. 24, 2024

(54) LAMP AND OPERATING METHOD OF THE LAMP

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 48 days.

(21) Appl. No.: 18/145,646

(22) Filed: Dec. 22, 2022

(65) Prior Publication Data

US 2023/0389163 A1 Nov. 30, 2023

(30) Foreign Application Priority Data

May 27, 2022 (KR) ........................ 10-2022-0065451
Sep. 7, 2022 (KR) ........................ 10-2022-0113675

(51) Int. Cl.
*H05B 47/16* (2020.01)
*H05B 47/155* (2020.01)
*H05B 47/165* (2020.01)

(52) U.S. Cl.
CPC .......... *H05B 47/16* (2020.01); *H05B 47/155* (2020.01); *H05B 47/165* (2020.01)

(58) Field of Classification Search
CPC .... H05B 47/16; H05B 47/155; H05B 47/165; H05B 45/325; H05B 45/44
See application file for complete search history.

(56) References Cited

U.S. PATENT DOCUMENTS

2018/0056853 A1* 3/2018 Muramatsu .......... H05B 45/375
2019/0086065 A1* 3/2019 Hirose .................. H05B 45/38
2019/0202344 A1* 7/2019 Maruyama ............ H05B 47/17

* cited by examiner

*Primary Examiner* — Daniel D Chang
(74) *Attorney, Agent, or Firm* — NovoTechIP International PLLC

(57) ABSTRACT

According to an embodiment disclosed herein, a lamp includes a plurality of light sources connected in series to one another, a light source controller that controls an operation of each of the plurality of light sources based on a control signal, and a signal controller that generates the control signal containing a duty cycle set such that an operating voltage of the plurality of light sources does not exceed a preset value and controls an operation of the light source controller in a time division manner.

20 Claims, 16 Drawing Sheets

LAMP AND OPERATING METHOD OF THE LAMP

CROSS-REFERENCE TO RELATED APPLICATION

This application claims the benefit of priority to Korean Patent Application No. 10-2022-0065451, filed in the Korean Intellectual Property Office on May 27, 2022, and Korean Patent Application No. 10-2022-0113675, filed in the Korean Intellectual Property Office on Sep. 7, 2022 the entire contents of which are incorporated herein by reference.

TECHNICAL FIELD

The present disclosure relates to a lamp and an operating method thereof.

BACKGROUND

In general, a headlamp of a vehicle is used to secure a stable front view in situations such as nighttime, tunnels with dark surroundings, fog, or rain.

Recently, as the use of high-resolution LEDs has been expanded, high-resolution LEDs are also used in headlamps of vehicles. Accordingly, technologies and applications for projecting images onto a road surface or a specific object using vehicle headlamps are being developed.

Many power supply devices are required to supply power to the LEDs because headlamps using high-resolution LEDs use a large number of LEDs compared to general headlamps.

When many power supply devices are provided to supply power to a plurality of LEDs that are high-resolution LEDs, there is a problem that not only a material cost increases but also the area of a relevant circuit board increases.

To solve this problem, a method of supplying power by connecting LED columns has been proposed, but there is a problem that a difference in currents occurs and the number of connector pins increases when the LED columns are connected in parallel, and when the LED columns are connected in series, there is a problem with exceeding the output limits of the device.

SUMMARY

The present disclosure has been made to solve the above-mentioned problems occurring in the prior art while advantages achieved by the prior art are maintained intact.

An aspect of the present disclosure provides a lamp in which material costs and circuit board areas are reduced by optimizing and reducing the number of power supply devices and an operating method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp may include a plurality of light sources connected in series to one another, a light source controller that controls an operation of each of the plurality of light sources based on a control signal, and a signal controller that generates the control signal containing a duty cycle set such that an operating voltage of the plurality of light sources does not exceed a preset value and controls an operation of the light source controller in a time division manner.

According to an embodiment, the light source controller may be provided in plural, and the plurality of light source controllers may correspond to the plurality of light sources on a one-to-one basis and control operations of the plurality of light sources.

According to an embodiment, the signal controller may set a duty ratio of each of the plurality of light sources such that on-times of the plurality of light sources do not overlap each other, and set a duty ratio of transient intervals between the on-times of the light sources.

According to an embodiment, the signal controller may control a sum of the duty ratio of each of the plurality of light sources and the duty ratio of each of the transient intervals not to exceed 100%.

According to an embodiment, the signal controller may control currents flowing through the plurality of light sources based on the duty cycle.

According to an embodiment, the signal controller may perform control such that the current flowing through the plurality of light sources does not exceed a first value.

According to an embodiment, each of the plurality of light sources may include at least one LED connected in series.

According to an embodiment, the signal controller may receive vehicle-related information and generate the control signal based on the vehicle-related information.

According to an embodiment, the vehicle-related information may include dark zone information, and the signal controller may perform control to turn off an LED corresponding to the dark zone information at an on-time of the plurality of light sources based on the dark zone information.

According to an embodiment, the signal controller may set a duty ratio for each of the LEDs of the plurality of light sources and adjust a period of the control signal based on an on-time of the LED.

According to an embodiment, the signal controller may perform control to stop supplying power to the plurality of light sources within a period of the control signal when the operating voltage of the plurality of light sources exceeds a second value.

The lamp may further include at least one power supply configured to supply power to the plurality of light sources.

According to an embodiment, the power supply may include a first power supply to an n-th power supply (n is a natural number of 2 or more), and the plurality of light sources may include a first light source group to an n-th light source group. The first to n-th light source groups may be defined such that currents supplied by the power supplies do not exceed a third value, and the first power supply to the n-th power supply may correspond to the first light source group to the n-th light source group on a one-to-one basis and respectively supply power to the first light source group to the n-th light source group.

According to an embodiment, the signal controller may control an on/off frequency of the plurality of light sources to be equal to or greater than a fourth value.

According to an aspect of the present disclosure, a lamp includes a plurality of light sources each including a plurality of LEDs connected in series to each other, a light source controller that corresponds to the plurality of light sources on a one-to-one basis and controls an operation of each of the plurality of light sources based on a control signal and a signal controller that generates the control signal containing a duty cycle set for each of the plurality of LEDs such that an operating voltage of the plurality of light sources does not exceed a preset value and controls operations of the light source controllers in a time division manner.

According to an embodiment, the plurality of light sources may be connected in series to each other.

According to an embodiment, the signal controller may set the duty cycle such that a sum of a number of the plurality of LEDs simultaneously turned on based on the preset value does not exceed a fifth value.

According to an embodiment, the signal controller may set the duty cycle of each of the plurality of LEDs such that each of the plurality of LEDs of the plurality of light sources is turned on at least once within the period of the control signal.

According to an embodiment, the signal controller may set the duty ratio of each of the plurality of LEDs within an on-time of the plurality of light sources to individually control a current value of each of the plurality of LEDs and a time point when each of the plurality of LEDs is turned on or off.

According to an embodiment, the plurality of light sources may be connected in parallel to each other, and the signal controller may be configured to control the light source controller such that on-times of the plurality of light sources do not overlap each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
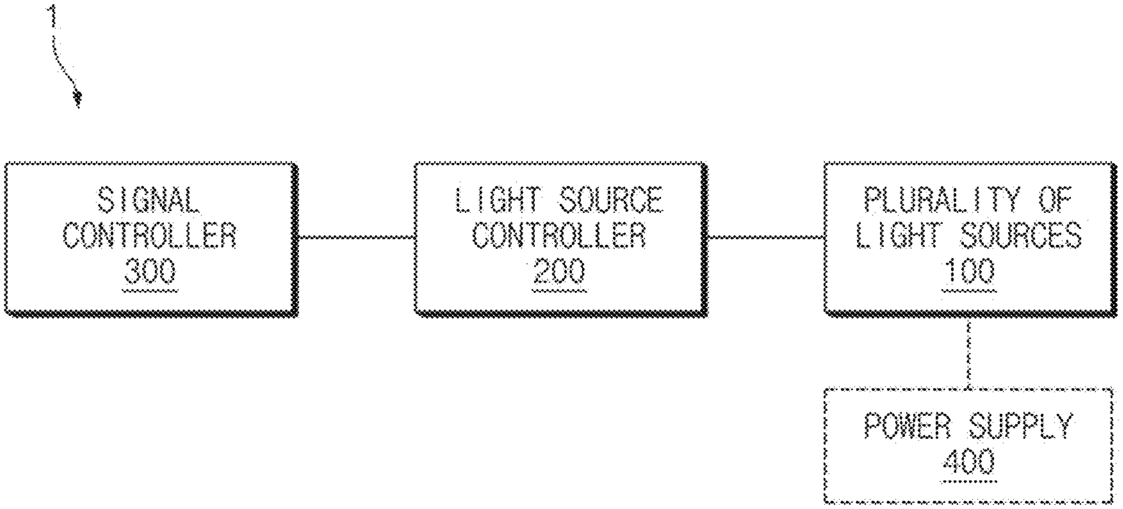
FIG. 1 is a diagram illustrating a block diagram of a lamp according to an embodiment disclosed herein.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

In this specification, the singular form of a noun corresponding to an item may include one item or a plurality of items, unless the context clearly dictates otherwise. In this document, each of phrases such as "A or B", "at least one of A and B", "at least one of A or B", "A, B or C", "at least one of A, B and C" and "at least one of A, B or C" may include any one of the items listed together in the corresponding one of the phrases, or all possible combinations thereof. Tams such as "first", "second" may simply be used to distinguish a given component from other corresponding components, and do not limit a given component in another aspect (e.g., importance or order). When a certain (e.g., first) component is mentioned as being "coupled" or "connected" to another (e.g., second) component, with or without the terms "functionally" or "communicatively", it means that the certain component is able to be connected to the other component directly (e.g. by wire), wirelessly, or through a third component.

Each component (e.g., module or program) of the components described herein may include singular or plural objects. According to various embodiments, one or more components or operations among corresponding components may be omitted, or one or more other components or operations may be added. Alternatively or additionally, a plurality of components (e.g., modules or programs) may be integrated into a single component. In this case, the integrated component may perform one or more functions of the plurality of components identically or similarly to those performed by corresponding components of the plurality of components prior to the integration. Operations performed by a module, a program, or other components according to various embodiments may be executed sequentially, in parallel, repeatedly, or in a heuristic method. In addition, one or more of the operations may be executed in different sequences or may be omitted. Alternatively, one or more other operations may be added.

The term "module" or "unit" used in the disclosure may represent, for example, a unit including one or more combinations of hardware, software and firmware. The team "module" may be interchangeably used with the terms "unit", "logic", "logical block", "part" and "circuit". The "module" may be a minimum unit of an integrated part or a part thereof or may be a minimum unit for performing one or more functions or a part thereof. For example, according to one embodiment, a module may be implemented in the form of an application-specific integrated circuit (ASIC).

Various embodiments of this document may be implemented as software (e.g., a program or application) including one or more instructions stored in a storage medium (e.g., memory) readable by a machine. For example, the processor of the device may call at least one command among one or more commands stored from a storage medium and execute it. This enables the device to be operated to perform at least one function according to the at least one command invoked. The one or more instructions may contain a code made by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

FIG. 1 is a diagram illustrating a block diagram of a lamp according to an embodiment disclosed herein.

Referring to FIG. 1, a lamp 1 may include a plurality of light sources 100, a light source controller 200, and a signal controller 300.

The lamp 1 may include various lamps existing in a vehicle, for example, a head lamp, a rear lamp, a tail lamp, and the like. For example, the lamp 1 may be a vehicle headlamp, and the headlamp may include a high-resolution headlamp using a Digital Micro-mirror Device (DMD), LED MATRIX, or the like. The lamp 1 may be integrally formed with internal control units of the vehicle, or may be implemented as a separate device and connected to the control units of the vehicle.

According to an embodiment, the lamp 1 may include the plurality of light sources 100, and emit light on a road surface or a specific object to output and display an image, or the like by controlling operations of the plurality of light sources 100. In this case, the plurality of light sources 100 may be connected in series to one another. In the lamp 1, the plurality of light sources 100 are connected in series to each other to prevent a difference between currents flowing through light sources from occurring, and the lamp 1 may control the operations of the plurality of light sources 100 such that the operating voltages of the plurality of light sources 100 do not exceed a preset value. In this case, the operating voltages of the plurality of light sources 100 may include a voltage between both ends of the plurality of light sources 100. For example, when the plurality of light sources are connected in series to each other from the first light source to the n-th light source sequentially, the operating voltage of the plurality of light sources 100 may refer to a voltage between one end of the first light source and the other end of the n-th light source.

According to an embodiment, the lamp 1 may include a measuring unit (not shown) for measuring voltages, currents, or the like of the plurality of light sources 100. The lamp 1 may control the operations of the plurality of light sources 100 by generating a control signal based on voltages, currents, or the like of the plurality of light sources 100 measured by the measuring unit. The measuring unit may be electrically connected to the components of the lamp 1 such as the plurality of light sources 100, the light source controller 200, and the signal controller 300.

According to an embodiment, the light source controller 200 may control operations of the plurality of light sources 100 based on the control signal. The light source controller 200 may include a switch (not shown) for controlling, for example, lighting (on/off) of the plurality of light sources 100. The switch may include an electronic switch and, for example, the switch may control the on/off of the plurality of light sources 100 based on an applied voltage. For example, the light source controller 200 may perform control to turn on the plurality of light sources 100 when a voltage of 5V is applied, and perform control to turn off the plurality of light sources 100 when no voltage is applied.

According to an embodiment, the light source controller 200 may be provided in plural. In this case, the light source controllers 200 may respectively correspond to the plurality of light sources 100 on a one-to-one basis to individually control the operations of the plurality of light sources 100. According to another embodiment, one light source controller 200 may control the on/off of all the plurality of light sources 100, and each of the light source controllers 200 may control one light source or two or more light sources.

According to an embodiment, the signal controller 300 may generate a control signal including a duty cycle so that the operating voltages of the plurality of light sources 100 do not exceed a preset value. The signal controller 300 may be electrically connected to the light source controller 200 to electrically control the light source controller 200. In addition, the signal controller 300 may include an electric circuit for executing a command of software, thereby performing various data processing and calculations. The signal controller 300 may include, for example, a micro processor unit (MPU), a micro controller unit (MCU), a central processing unit (CPU), an electronic controller unit (ECU), and the like.

According to an embodiment, the control signal may be a digital signal, and may include, for example, a PAM signal, a PWM signal, a PPM signal, and the like. The control signal may contain a duty cycle. For example, the control signal may be a PWM signal, and the duty cycle may include a cycle in which the operation time of the plurality of light sources 100 or the like is expressed as a duty ratio within one period of the PWM signal. In this case, the duty ratio may be expressed as a ratio value between 0 and 1 or as a percentage value between 0% and 100%.

According to an embodiment, the preset value may include a maximum forward voltage value of each of the plurality of light sources 100, and may be set to, for example, 50V. In this case, the maximum forward voltage of the light source may mean a voltage when all components included in the light source, for example, an LED, and the like are turned on for operation. According to another embodiment, the preset value may be set by measuring a range of a voltage in which the plurality of light sources 100 are able to operate without being damaged through an experiment or the like.

According to an embodiment, the signal controller 300 may control the operation of the light source controller 200 based on the control signal in a time division manner. The signal controller 300 may control the operations of the plurality of light sources 100 by controlling the operation of the light source controller 200 in a time division manner based on the control signal, and accordingly, the operating voltage of the plurality of light sources 100 may be controlled not to exceed the preset value.

According to an embodiment, the signal controller 300 may control the on/off frequency of the plurality of light sources 100 to be equal to or greater than a fourth value. The signal controller 300 may control the on-off frequency of the plurality of light sources 100 to be greater than or equal to the fourth value to allow a human being to recognize the plurality of light sources 100 as being continuously turned on when the human being sees the lamp 1. For example, the fourth value may be set to 60 Hz, which is a criterion for a human to recognize that images are continuous.

According to an embodiment, the lamp 1 may further include a power supply 400 for supplying power to the plurality of light sources 100. The configuration and operation of the power supply 400 will be described later with reference to FIG. 7.

Figure 2:
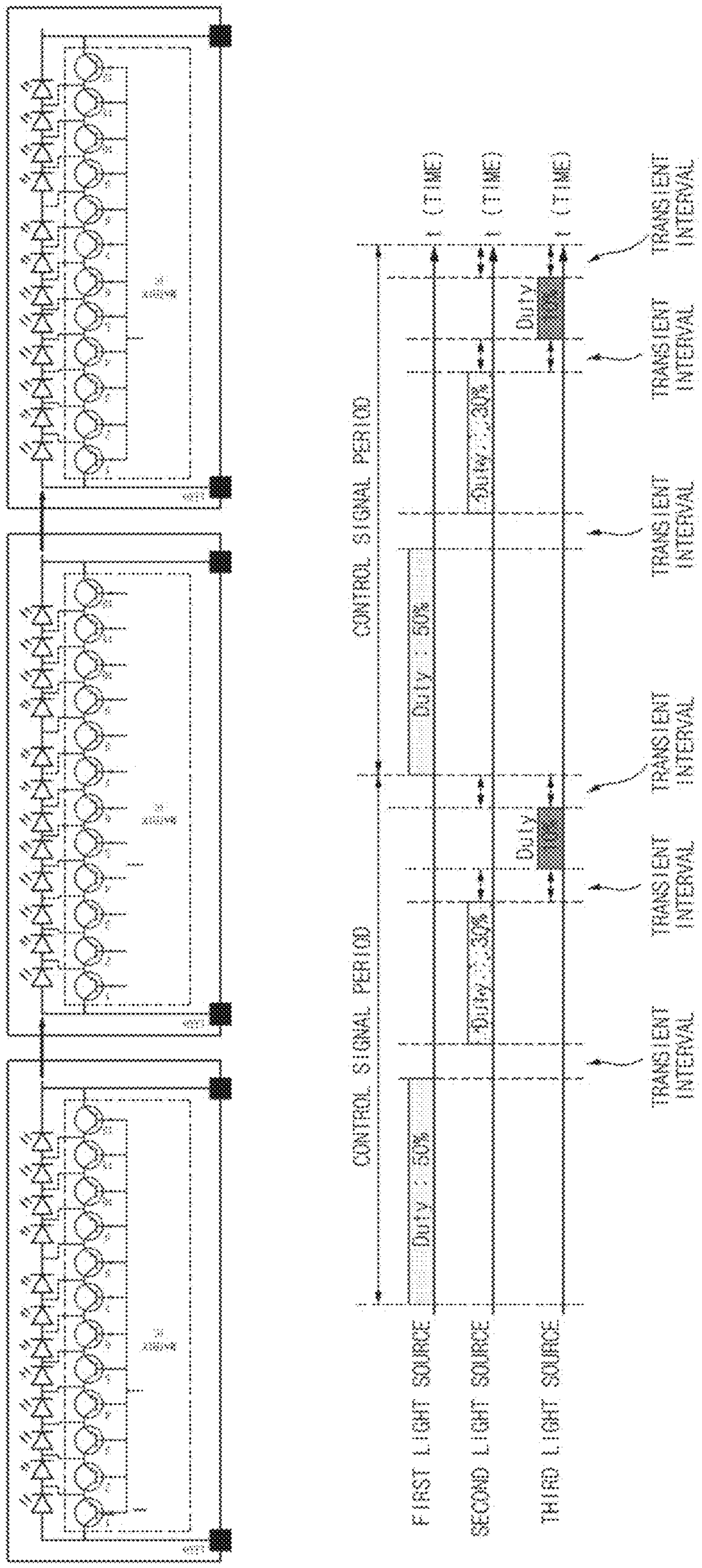
FIG. 2 is a diagram illustrating an example of setting a duty ratio of a plurality of light sources and a transient section according to an embodiment disclosed herein.

FIG. 2 is a diagram illustrating an example of setting a duty ratio of a plurality of light sources and a transient section according to an embodiment disclosed herein.

Referring to FIG. 2, the signal controller 300 may set duty ratios of a plurality of light sources and transient intervals within a period of a control signal.

According to an embodiment, the signal controller 300 may set duty ratios of light sources such that the on-times of the plurality of light sources 100 do not overlap each other, and set a duty ratio of a transient interval between the on-times of the light sources. Accordingly, the signal controller 300 may sequentially control the plurality of light sources 100. In this case, setting the duty ratio of each light source may mean setting a plurality of LEDs included in the each light source to the same duty ratio. That is, according to an embodiment, the signal controller 300 may collectively control a plurality of LEDs included in each of the light sources 100 rather than individually control the plurality of LEDs included in the plurality of light sources 100. For example, when a first light source 110 is turned on according to settings of the duty ratio by the signal controller 300, a plurality of LEDs included in the first light source 110 may all be turned on at the same time.

The preset value may be set to the maximum forward voltage value of each of the plurality of light sources 100. In this case, when two or more light sources among the plurality of light sources 100 are turned on at the same time, the operating voltage of the plurality of light sources 100 may exceed the preset value. Accordingly, the signal controller 300 may perform control such that the on-times of the plurality of light sources 100 do not overlap each other and therefore, perform control such that the operating voltage of the plurality of light sources 100 does not exceed the preset value.

In addition, when the signal controller 300 controls the operations of the plurality of light sources 100 by controlling the light source controller 200 based on a control signal, there may occur a case in which the light sources 100 are turned on at the same time due to timing errors, signal errors or the like in a process of turning on or off the light sources. To prevent this, the signal controller 300 may set a duty ratio of a transient interval between the on-times of the light sources. Therefore, it is possible to prevent an overvoltage from occurring during a process for turning on/off the plurality of light sources 100.

According to an embodiment, the signal controller 300 may control the sum of a duty ratio of each of the plurality of light sources 100 and a duty ratio of each of the transient intervals not to exceed 100%. When the sum of the duty ratio of each of the plurality of light sources 100 and the duty ratio of each of the transient intervals exceeds 100%, two or more light sources among the plurality of light sources 100 may be simultaneously turned. Accordingly, the signal controller 300 may perform control such that the operating voltage of the plurality of light sources 100 does not exceed a preset value by adjusting the duty ratio.

For example, as shown in FIG. 2, the plurality of light sources 100 may include the first light source 110, a second light source 120, and a third light source 130. The signal controller 300 may set the duty ratio of the first light source 110 to 50%, the duty ratio of the second light source 120 to 30%, the duty ratio of the third light source 130 to 10%, and the duty ratio of each transient interval to 5%, making it possible to perform control such that the sum of the duty ratios does not exceed 100%.

According to an embodiment, when the operating voltage of the plurality of light sources 100 exceeds a second value, the signal controller 300 may perform control to stop supplying power to the plurality of light sources 100 within the period of a control signal. The second value may be, for example, a value greater than a preset value. Even when the signal controller 300 sets a transient interval for the on time of each light source, the operating voltage of the plurality of light sources 100 may exceed the second value during a control process. In this case, the signal controller 300 may perform control to stop the supply of power to the plurality of light sources 100 within a corresponding control signal period to prevent damage to the plurality of light sources 100.

The number of light sources and the duty ratio of each light source and the transient interval in the plurality of light sources 100 shown in FIG. 2 are merely examples and are not limited thereto.

Figure 3A:
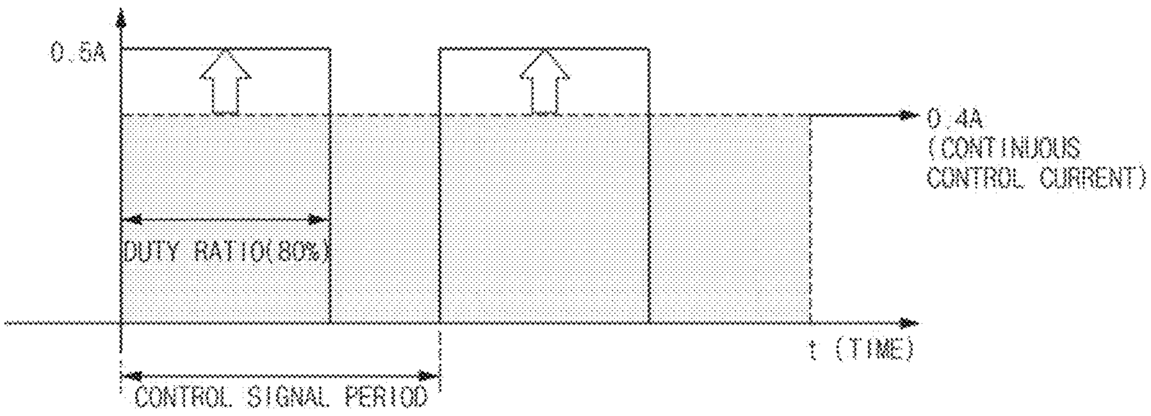
FIGS. 3A and 3B are diagrams illustrating current control of a plurality of light sources according to an embodiment disclosed herein.
Figure 3B:
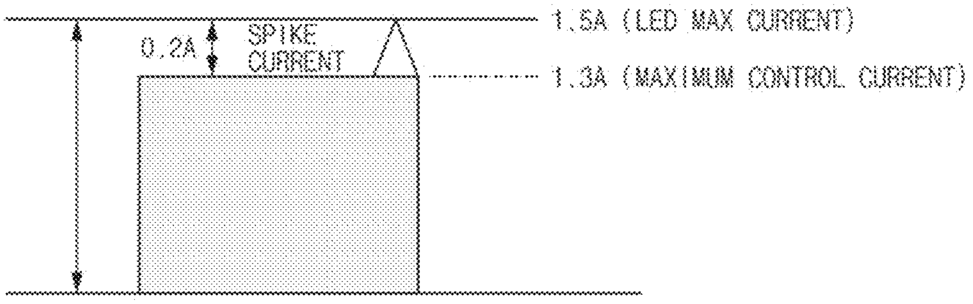

FIGS. 3A and 3B are diagrams illustrating current control of a plurality of light sources according to an embodiment disclosed herein.

Referring to FIGS. 3A and 3B, the signal controller 300 may control currents of the plurality of light sources 100.

According to an embodiment, the signal controller 300 may control currents flowing through the plurality of light sources 100 based on a duty cycle.

For example, when the plurality of light sources 100 are continuously turned on, that is, when the duty ratio is 100%, if the amount of light emitted during one cycle of the control signal is "A", and the duty ratio is "B" ($0<B<1$) in the case where the currents flowing through the plurality of light sources 100 are the same, the amount of light emitted during one cycle of the control signal may be AB, which is smaller than the existing amount of light, "A". As described above, when the duty ratio of the plurality of light sources 100 is reduced, it is necessary to increase the amount of light emitted per unit time in order for the plurality of light sources 100 to emit the same amount of light during one cycle of the control signal. To this end, it is necessary to increase currents flowing through the plurality of light sources 100. Accordingly, the signal controller 300 may increase the currents flowing through the plurality of light sources 100 based on the duty cycle to allow the amount of light emitted during one period of the control signal to be kept constant.

According to an embodiment, the signal controller 300 may control the currents flowing through the plurality of light sources 100 to be inversely proportional to the duty ratio as shown in Equation 1 below.

$$\text{Current}=(\text{continuous control current})/\text{duty ratio} \qquad \text{[Equation 1]}$$

where the continuous control current may denote a current flowing when the duty ratios of the plurality of light sources 100 is 100%, that is, a current flowing when the plurality of light sources 100 are continuously turned on. In addition, in the calculation of [Equation 1], the duty ratio may use a ratio value expressed as a ratio between 0 and 1.

According to an embodiment, the signal controller 300 may perform control such that the currents flowing through the plurality of light sources 100 do not exceed a first value. Since the signal controller 300 continuously controls the on/off of a plurality of LEDs, a spike current may be caused during the process for continuous on/off. Accordingly, the first value may be set as a value obtained by subtracting the spike current value from the maximum current value of a current capable of flowing through each LED of the plurality of light sources 100. For example, when the maximum current value of the LED is 1.5 A and the spike current is 0.2 A, the first value may be set to 1.3 A. In this case, the spike current may be measured through an experiment or the like, and the spike current value may include an average value, a minimum value, a maximum value, and the like of the measured spike currents.

Figure 4:
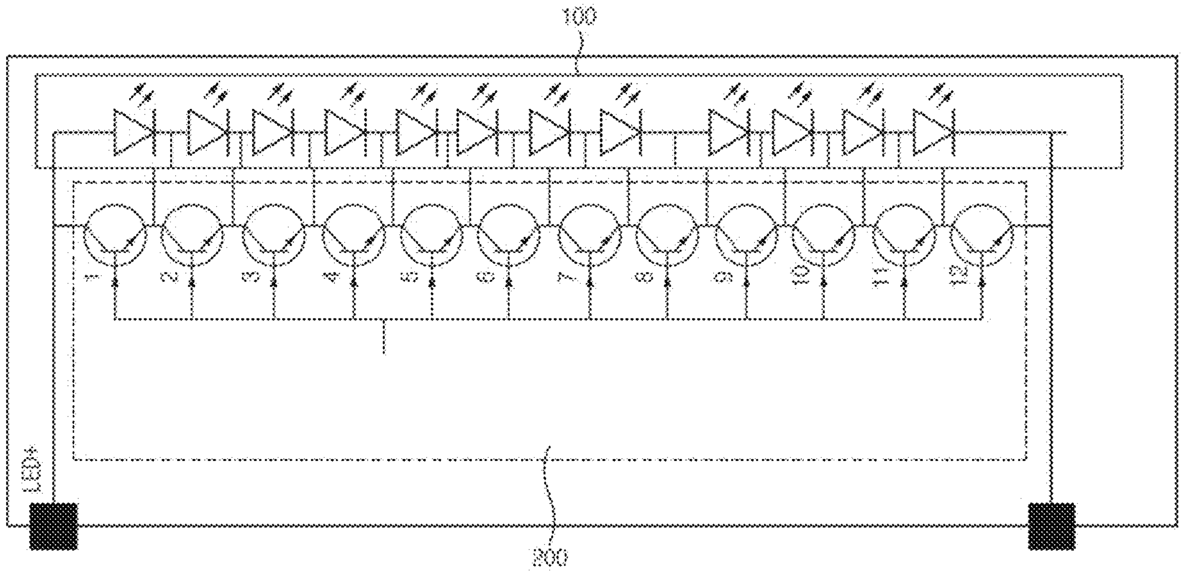
FIG. 4 is a diagram illustrating an example of a light source including at least one LED according to an embodiment disclosed herein.

FIG. 4 is a diagram illustrating an example of a light source including at least one LED according to an embodiment disclosed herein.

Referring to FIG. 4, each of the plurality of light sources 100 may include at least one LED connected in series to each other. The LEDs may be identical and may have the same forward voltage. In addition, each of the plurality of light sources 100 may include the same number of LEDs and have the same maximum forward voltage. The operation of each LED may be individually controlled through the light source controller 200.

Although FIGS. 4 shows 12 LEDs and 12 switches for controlling the LEDs, this is only an example, and the number of LEDs and the number of switches included in the light source controller 200 are not limited thereto.

Figure 5:
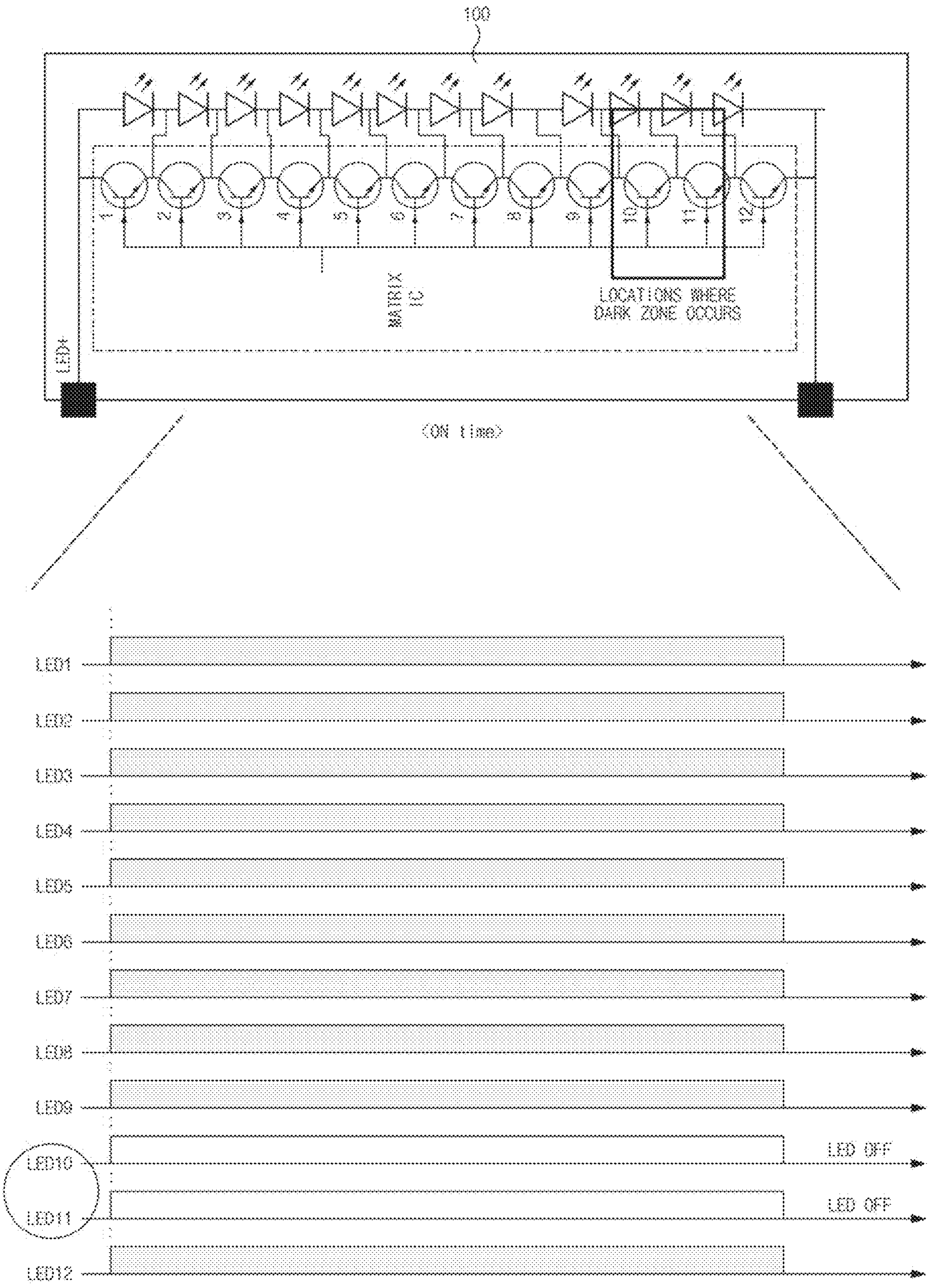
FIG. 5 is a diagram illustrating an example of a control signal generated based on vehicle-related information according to an embodiment disclosed herein.

FIG. 5 is a diagram illustrating an example of a control signal generated based on vehicle-related information according to an embodiment disclosed herein.

Referring to FIG. 5, the signal controller 300 may generate a control signal based on vehicle-related information.

According to an embodiment, the signal controller 300 may receive vehicle-related information. The signal controller 300 may include a communication device (not shown) for obtaining vehicle-related information. The communication device may receive vehicle-related information obtained from various vehicle sensors and the like. The communication method of the communication device may include wireless Internet technologies such as wireless LAN (WLAN), Wireless Broadband (Wibro), Wi-Fi, Wimax (World Interoperability for Microwave Access) and the like and short-range communication technologies such as Bluetooth, ZigBee, Ultra-Wideband (UWB), Radio Frequency Identification (RFID), Infrared Data Association (IrDA), and the like.

According to an embodiment, the signal controller 300 may generate a control signal based on vehicle-related information. The vehicle-related information may include, for example, dark zone information, lamp steering, vehicle speed, vehicle acceleration, line information, road surface information, and the like. As an example, the signal controller 300 may receive vehicle traveling direction information and generates a control signal for controlling the lighting of the plurality of light sources 100 to correspond to an arrow image to output the arrow image corresponding to the traveling direction.

According to an embodiment, the signal controller 300 may perform control to turn off an LED corresponding to the dark zone information during the on-time of the plurality of light sources 100 based on the dark zone information. The dark zone information may include, for example, information on a region to which an opposing vehicle belongs among light-emitting regions of the plurality of light sources 100. In this case, the signal controller 300 may perform control to turn off the LED corresponding to the dark zone information such that that light is not emitted toward a dark zone even when the plurality of light sources 100 operate in the on-time.

For example, it can be seen from FIG. 5 that the signal controller 300 generates a control signal for turning off a corresponding LED even though the light source is in on-time, when the 10th LED and the 11th LED of the light source belong to locations in which the dark zone occurs based on the dark zone information.

Figure 6A:
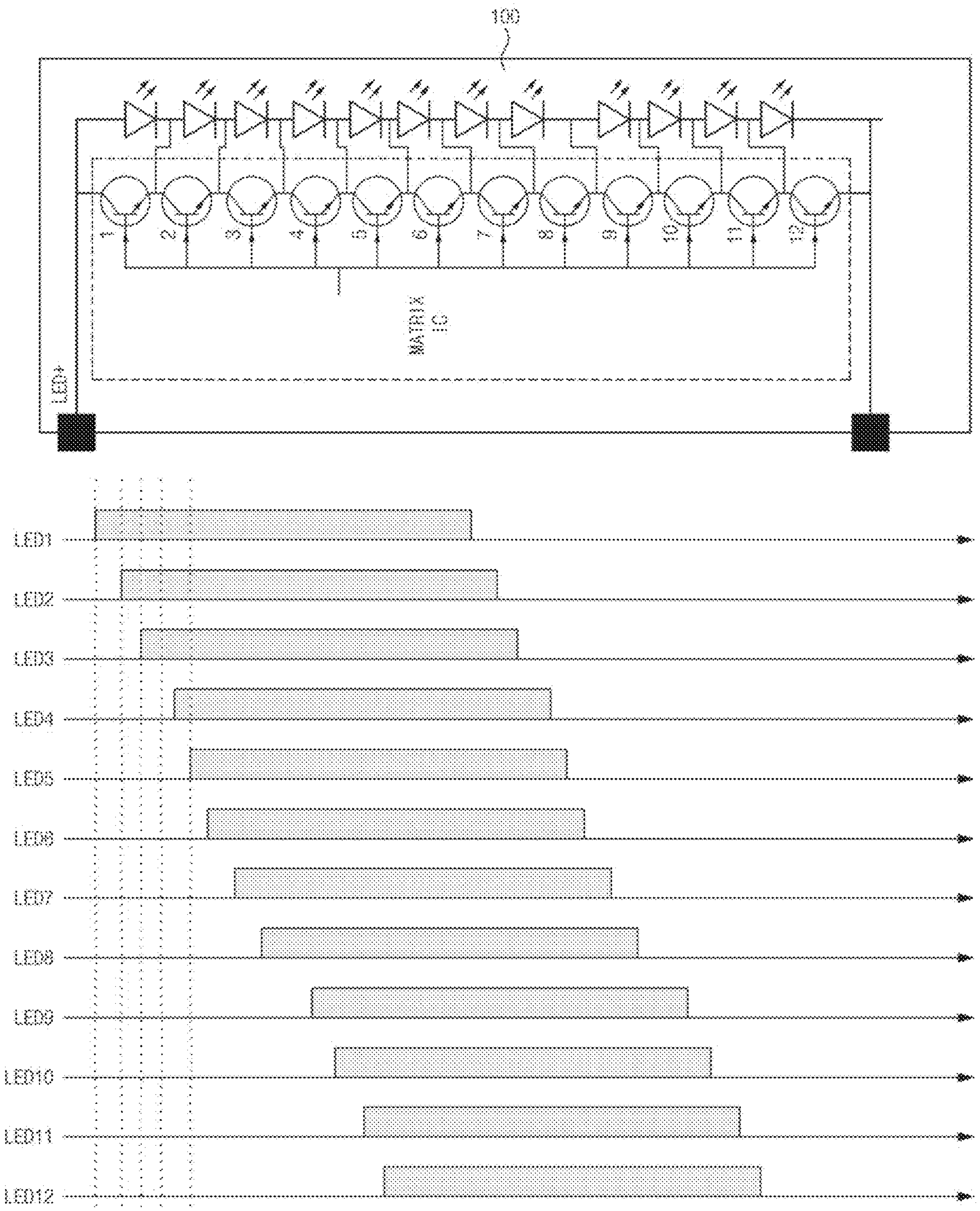
FIGS. 6A and 6B are diagrams illustrating an example of setting a duty ratio for each LED according to an embodiment disclosed herein.
Figure 6B:
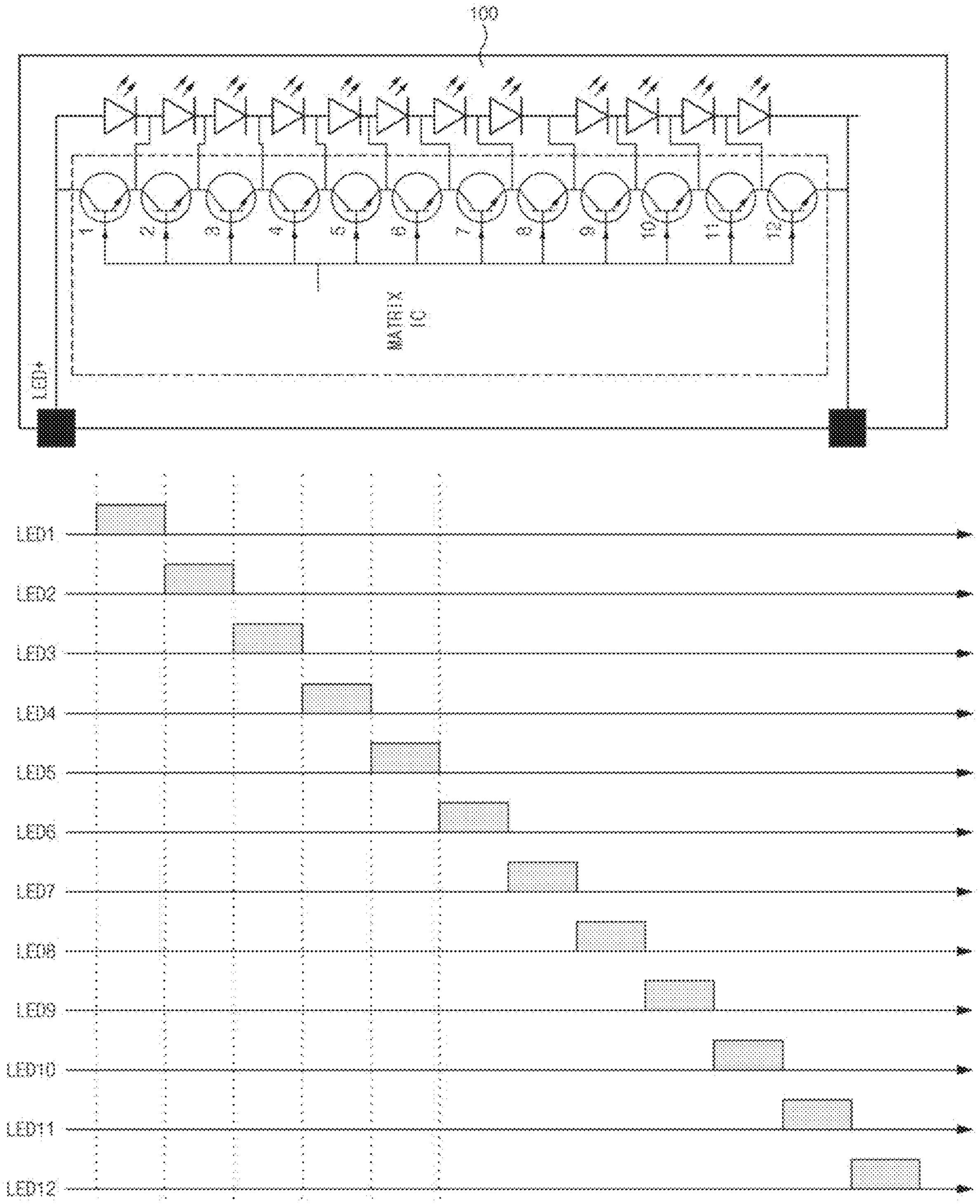

FIGS. 6A and 6B are diagrams illustrating an example of setting a duty ratio for each LED according to an embodiment disclosed herein.

Referring to FIGS. 6A and 6B, the signal controller 300 may set a duty ratio for each LED.

According to an embodiment, the signal controller 300 may set a duty ratio for each LED of the plurality of light sources 100, and adjust the cycle of a control signal based on the on-times of the LEDs. In the plurality of light sources 100, at least one LED may be connected in series, for example, 12 LEDs may be connected in series to each other. In this case, when all LEDs included in the light source are simultaneously controlled to be turned on/off in the process of turning on the plurality of light sources 100, a spike current may occur and the LEDs may be damaged by the spike current. Accordingly, the signal controller 300 may set a duty ratio for each LED and precisely control the on or off time of each LED to prevent damage to the LEDs.

For example, the signal controller 300 may set the duty ratio such that the on-times of the LEDs partially overlap each other as shown in FIG. 6A, and may set the duty ratio such that the on-times of the LEDs do not overlap each other at all as shown in FIG. 6B. Although the example of setting the duty ratio for each LED is disclosed in FIGS. 6A and 6B, this is merely an example and the present disclosure is not limited thereto.

According to an embodiment, the signal controller 300 may adjust the cycle of a control signal based on the on-times of the LEDs. The duty ratio refers to an operating time within one cycle of the control signal, and therefore, the on-time of the LED may increase even through the duty ratios for the LEDs are the same. Accordingly, the signal controller 300 may increase the cycle of a control signal based on the on-times of the LEDs.

Figure 7:
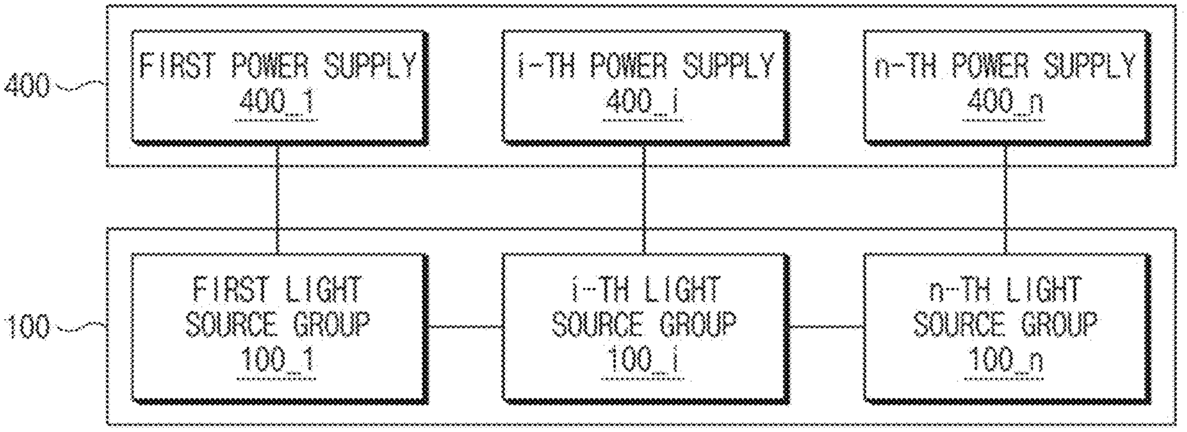
FIG. 7 is a diagram illustrating an example of a power supply and a plurality of light sources according to an embodiment disclosed herein.

FIG. 7 is a diagram illustrating an example of a power supply and a plurality of light sources according to an embodiment disclosed herein.

According to an embodiment, the lamp 1 may include at least one power supply 400 for supplying power to the plurality of light sources 100. The lamp 1 may reduce material costs and efficiently use the area of a PCB circuit board through optimization of the power supply rather than including power supplies for respectively supplying power to the plurality of light sources 100.

According to an embodiment, the power supply 400 may include a first power supply 400_1 to an n-th power supply **400_*n* (n is a natural number equal to or greater than 2). Each of the power supplies 400 may include a DC-DC converter. In addition, the plurality of light sources 100 may include a light source group for receiving power from the power supplies 400. For example, the plurality of light sources 100 may include a first light source group 100_1 to an n-th light source group 100_*n***.

In this case, the first light source group 100_1 to the n-th light source group **100_*n* may be defined such that a current supplied by each of the power supplies 400 does not exceed a third value. The third value may include, for example, a maximum current capable of flowing through LEDs constituting the plurality of light sources 100. The plurality of light sources 100 may include the same LEDs and alternatively may be configured in such a way that different LEDs are connected in series to each other. In this case, even when the same voltage is provided to the plurality of light sources 100, different currents may flow through the light sources. Accordingly, the lamp 1 may be configured such that the plurality of light sources 100 is grouped into the first light source group 100_1 to the n-th light source group 100_*n*, and the first power supply 400_1 to the n-th power supply 400_*n* respectively supply power to the light source groups to prevent a current exceeding the third value from flowing through all light sources. For example, the i-th power supply 400_*i* may supply power to the i-th light source group 100_*i***.

Figure 8:
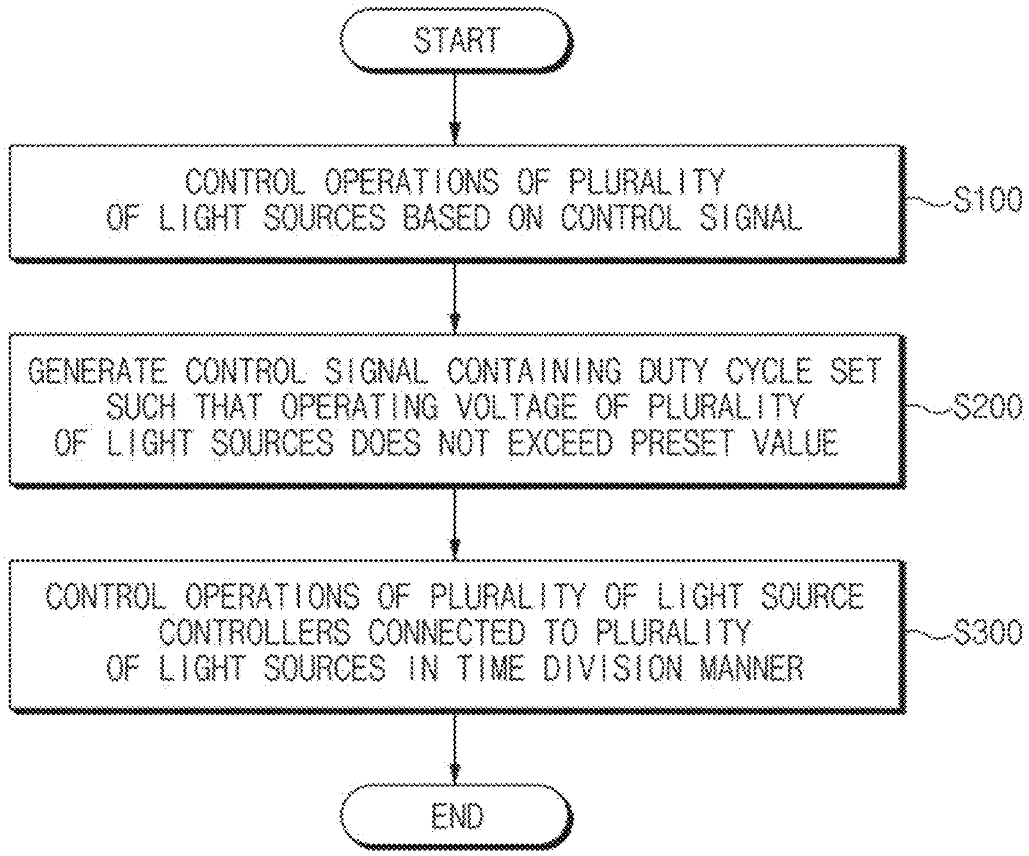
FIG. 8 is a flowchart for describing a method of operating a lamp according to an embodiment disclosed herein.

FIG. 8 is a flowchart for describing an operating method of a lamp according to an embodiment disclosed herein.

Referring to FIG. 8, a lamp control method may include controlling operations of a plurality of light sources based on a control signal (S100), generating a control signal including a duty cycle set such that an operating voltage of the plurality of light sources does not exceed a preset value (S200), and controlling an operation of a light source controller connected to a plurality of light sources in a time-division manner (S300)

In step S100, the light source controller 200 may control operations of the plurality of light sources 100 based on the control signal.

In step S200, the signal controller 300 may generate a control signal including a duty cycle such that the operating voltages of the plurality of light sources 100 do not exceed a preset value.

In step S300, the signal controller 300 may control the operation of the light source controller 200 connected to the plurality of light sources 100 in a time division manner. The plurality of light sources 100 and the light source controller 200 may be electrically connected.

Referring back to FIG. 1, the lamp 1 according to another embodiment disclosed herein may include the plurality of light sources 100, the light source controller 200, and the signal controller 300.

According to the embodiment, the lamp 1 may include the plurality of light sources 100 each including a plurality of LEDs connected in series. The plurality of light sources 100 may be connected in series or in parallel. The lamp 1 may control the operations of the plurality of light sources 100 to allow the plurality of light sources 100 to emit light toward a road surface or a specific object to output an image or the like and display the image on the road surface or the like. The plurality of light sources 100 may be classified according to the function of the lamp. For example, among the plurality of light sources 100, a first light source may output a high beam, and a second light source may output a low beam.

According to an embodiment, the plurality of light sources 100 may be connected in series. A description will be given under the assumption that the plurality of light sources 100 are connected in series with reference to FIGS. 9 to 11.

According to an embodiment, the light source controllers 200 may respectively correspond to the plurality of light sources 100 on a one-to-one basis, and respectively control operations of the plurality of light sources 100 based on a control signal. Each of the light source controllers 200 may be, for example, a matrix IC, and the matrix IC may include a switch (not shown) for controlling, for example, lighting (on/off) of each of the plurality of light sources 100. The switch may include an electronic switch and the switch may control the on/off of each of the plurality of light sources 100 based on an applied voltage. For example, each of the light source controllers 200 may perform control to turn on a corresponding light source among the plurality of light sources 100 when a voltage of 5V is applied, and perform control to turn off a corresponding light source among the plurality of light sources 100 when no voltage is applied. According to another embodiment, any one of the light source controllers 200 may control the on/off of all or some (two or more) of the plurality of light sources 100.

According to an embodiment, the signal controller 300 may be electrically connected to the light source controller 200 to electrically control the light source controller 200. In addition, the signal controller 300 may include an electric circuit for executing a command of software, thereby performing various data processing and calculations. The signal controller 300 may include, for example, a micro processor unit (MPU), a micro controller unit (MCU), a central processing unit (CPU), an electronic controller unit (ECU), and the like.

According to an embodiment, the signal controller 300 may generate a control signal including a duty cycle set in each of the plurality of LEDs such that the operating voltages of the plurality of light sources 100 do not exceed a preset value. In this case, the operating voltages of the plurality of light sources 100 may include a voltage between both ends of the plurality of light sources 100. For example, when the plurality of light sources 100 are connected in series to each other from the first light source to the n-th light source sequentially, the operating voltage of the plurality of light sources 100 may refer to a voltage between one end of the first light source and the other end of the n-th light source. When the plurality of light sources 100 are connected in parallel to each other, the operating voltage of the plurality of light sources 100 may refer to the maximum forward voltage of one light source connected in parallel.

According to an embodiment, the control signal may be a digital signal, and may include, for example, a PAM signal, a PWM signal, a PPM signal, and the like. In this case, the control signal may include a duty cycle set in each of a plurality of LEDs. For example, the control signal may be a PWM signal, and the duty cycle may include a cycle in which the operating time of the plurality of light sources 100 and/or the plurality of LEDs is expressed as a duty ratio within one period of the PWM signal. In this case, the duty ratio may be expressed as a ratio value between 0 and 1 or as a percentage value between 0% and 100%.

According to an embodiment, the signal controller 300 may control the operations of the light source controllers 200 in a time division manner. The signal controller 300 may control the operations of the light source controllers 200 in a time-division manner based on the control signal to prevent the operating voltages of the plurality of light sources 100 from exceeding a preset value.

According to an embodiment, the signal controller 300 may set a duty cycle based on the preset value such that the sum of the number of the plurality of LEDs which are to be simultaneously turned on does not exceed a fifth value. For example, when the preset value is 50V and the forward voltage of each LED is 4V, the first value may be set to 12. For example, when the plurality of light sources 100 include the first light source to the n-th light source, and the number of LEDs which are turned on among the plurality of LEDs included in the first light source to the n-th light source at a specific time is $a_1$ to $a_n$, the signal controller 300 may set the duty cycle of each of the plurality of LEDs such that $a_1 + a_2 + \ldots + a_n \leq$ first value is satisfied at all time points.

According to an embodiment, the signal controller 300 may perform control such that the on-off frequency of each of the plurality of LEDs included in the plurality of light sources 100 is to be a fourth value or more. The signal controller 300 may control the on-off frequency of the plurality of light sources 100 to be greater than or equal to the fourth value to allow a human being to recognize the plurality of light sources 100 as being continuously turned on when the human being sees the lamp 1. For example, the fourth value may be set to 60 Hz, which is a criterion for a human to recognize that images are continuous.

According to an embodiment, the lamp 1 may further include the power supply 400 for supplying power to the plurality of light sources 100.

Figure 9:
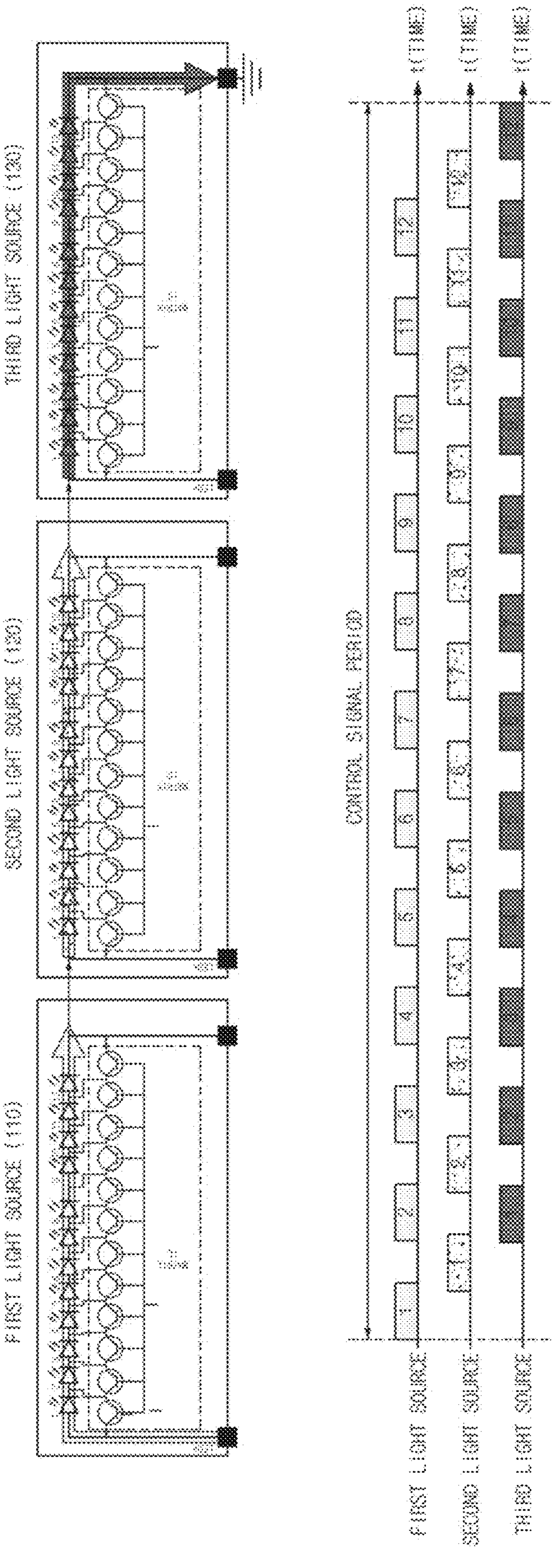
FIG. 9 is a diagram illustrating an example of setting a duty ratio of a plurality of light sources and a transient section according to an embodiment disclosed herein.

FIG. 9 is a diagram illustrating an example of individually controlling a plurality of LEDs included in a plurality of light sources according to an embodiment disclosed herein.

Referring to FIG. 9, the signal controller 300 may individually control the operation of each of the plurality of LEDs included in the plurality of light sources 100. The control signal may contain a duty cycle set for each of the plurality of LEDs, through which the operation of each of the plurality of LEDs may be controlled.

According to an embodiment, the signal controller 300 may set the duty cycle of each of the plurality of LEDs such that each of a plurality of LEDs included in each of the plurality of light sources 100 is turned on at least once within one cycle of a control signal. For example, as shown in FIG. 9, each of the first light source 110 to the third light source 130 may include 12 LEDs, and each LED may be turned on at least once within one cycle of a control signal.

According to an embodiment, the signal controller 300 may control the plurality of light sources 100 non-sequentially. For example, two or more of the plurality of light sources 100 may be turned on at the same time. In this case, the plurality of LEDs included in each light source may be individually controlled (e.g., controlled to be turned on/off) such that the operating voltage of the plurality of light sources 100 does not exceed a preset value. In this case, the duty ratios of the plurality of LEDs may be the same. Due to this, the signal controller 300 may individually control the plurality of LEDs included in each of the plurality of light sources 100 to perform control such that multiple light sources among the plurality of light sources 100 are simultaneously turned on at a specific time point.

Referring to FIGS. 2 and 9, the control method of the signal controller 300 according to FIG. 2 may be understood as controlling the plurality of light sources 100 sequentially, and the control method of the signal controller 300 according to FIG. can be understood as controlling the plurality of light sources 100 non-sequentially.

In addition, the number of light sources of the plurality of light sources 100 shown in FIG. 9, the duty ratio of each light source and the transient interval, and the number of LEDs included in each of the plurality of light sources 100 are examples, but are not limited thereto.

Figure 10A:
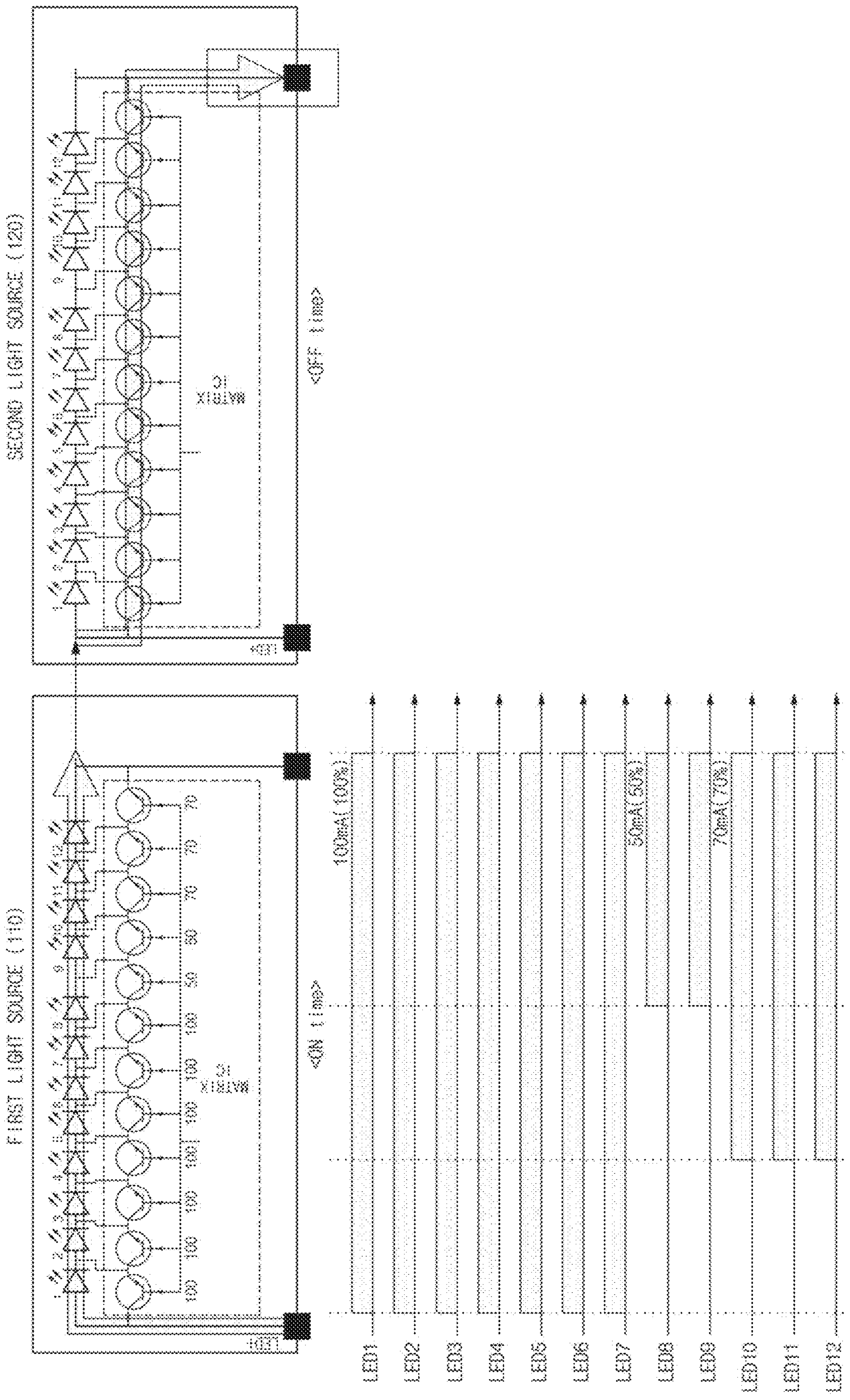
FIGS. 10A and 10B are diagrams illustrating an example of individually controlling a plurality of LEDs included in a plurality of light sources according to an embodiment disclosed herein.
Figure 10B:
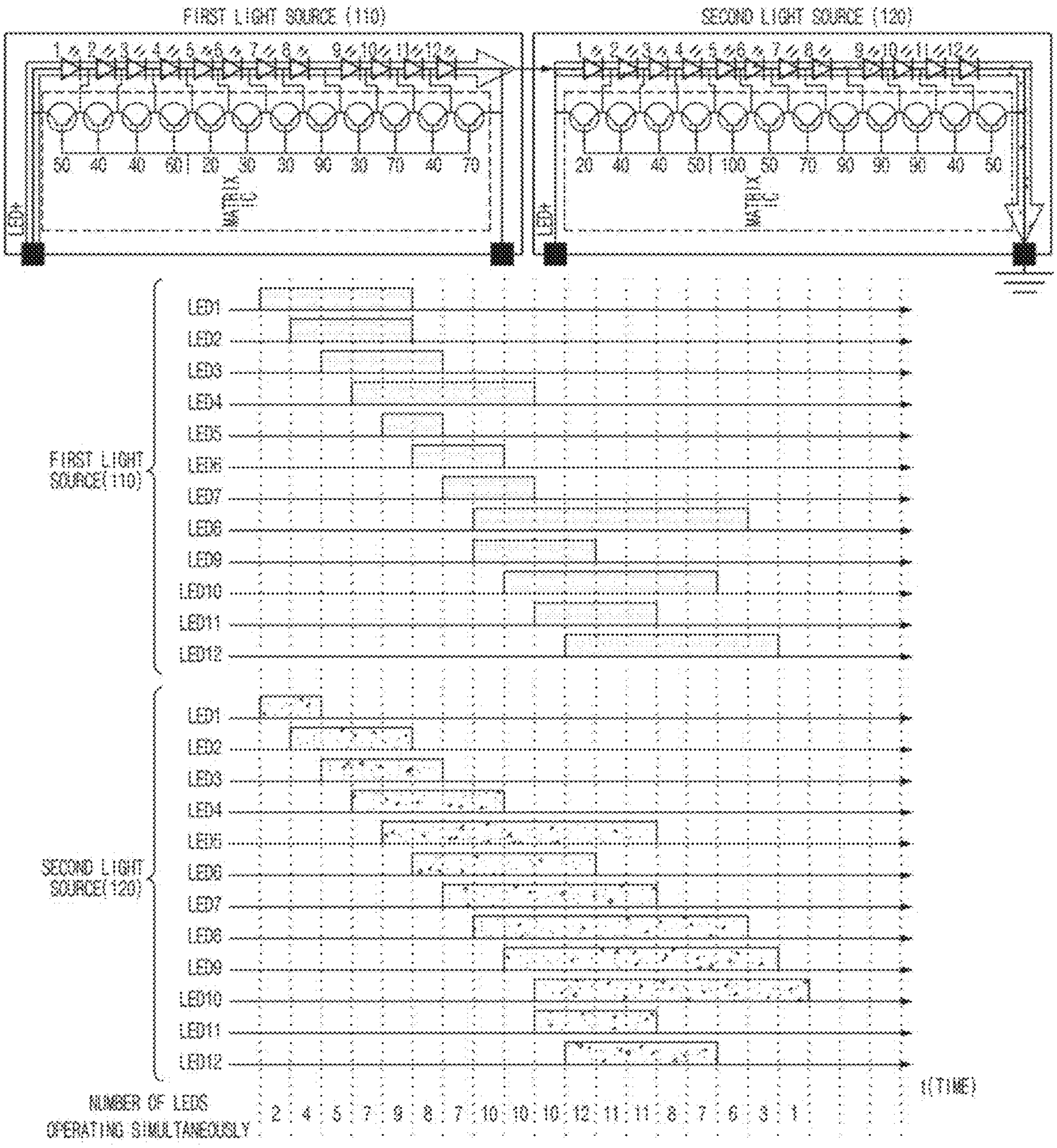

FIGS. 10A and 10B are diagrams illustrating an example of individually controlling a plurality of LEDs included in a plurality of light sources according to an embodiment disclosed herein.

Referring to FIGS. 10A and 10B, the signal controller 300 may individually control current values and on/off timing of a plurality of LEDs included in the plurality of light sources 100.

According to the embodiment, the signal controller 300 may set the duty ratio of each of the plurality of LEDs included in each of the plurality of light sources 100 within the on-time of the plurality of light sources 100, and individually control the current value and the on/off timing of each of the plurality of LEDs.

According to an embodiment, the signal controller 300 may set the duty ratio of each of the plurality of LEDs in the duty cycle set for each of the plurality of LEDs to control the on/off timing, the on-time, and current value of each LED. For example, when the duty ratio of a specific LED is 100%, the corresponding LED may be turned on throughout one cycle of the control signal. In addition, when the current flowing when the duty ratio of a specific LED is 100% is 100 mA, the duty ratio of the LED may be set to 50% to perform control such that a current of 50 mA flows through the LED. The signal controller 300 may individually control the plurality of LEDs such that the operating voltage of the plurality of light sources 100 does not exceed a preset value at all time points, thus lowering the possibility in which a spike current occurs during control for turning on/off the LEDs and preventing damage to the LEDs.

According to an embodiment, the signal controller 300 may individually control a plurality of LEDs included in the light source which are turned on in the process of sequentially controlling the plurality of light sources 100. In this case, the fact that the signal controller 300 sequentially controls the plurality of light sources 100 may mean that, for example, as shown in FIG. 2, the signal controller 300 performs control such that only one light source is turned on at a specific time point such that the on-times of the plurality of light sources 100 do not overlap each other. For example, as shown in FIG. 10A, the signal controller 300 may individually control a plurality of LEDs included in the first light source 110 within an on-time of the first light source 110.

According to another embodiment, the signal controller 300 may individually control a plurality of LEDs included in the light source which are turned on in the process of non-sequentially controlling the plurality of light sources 100. In this case, the fact that the signal controller 300 non-sequentially controls the plurality of light sources 100 may mean that, for example, two or more light sources among the plurality of light sources 100 are able to be simultaneously turned on as shown in FIG. 9. For example, as shown in FIG. 10B, the first light source 110 and the second light source 120 may be turned on at the same time, and in this case, the signal controller 300 may individually control the plurality of LEDs included in the first light source 110 and the second light source 120. In this case, the signal controller 300 may control time points when each LED is turned on and off by controlling the duty ratio of each LED so that the number of LEDs simultaneously turned on at a specific time does not exceed the first value.

Figure 11:
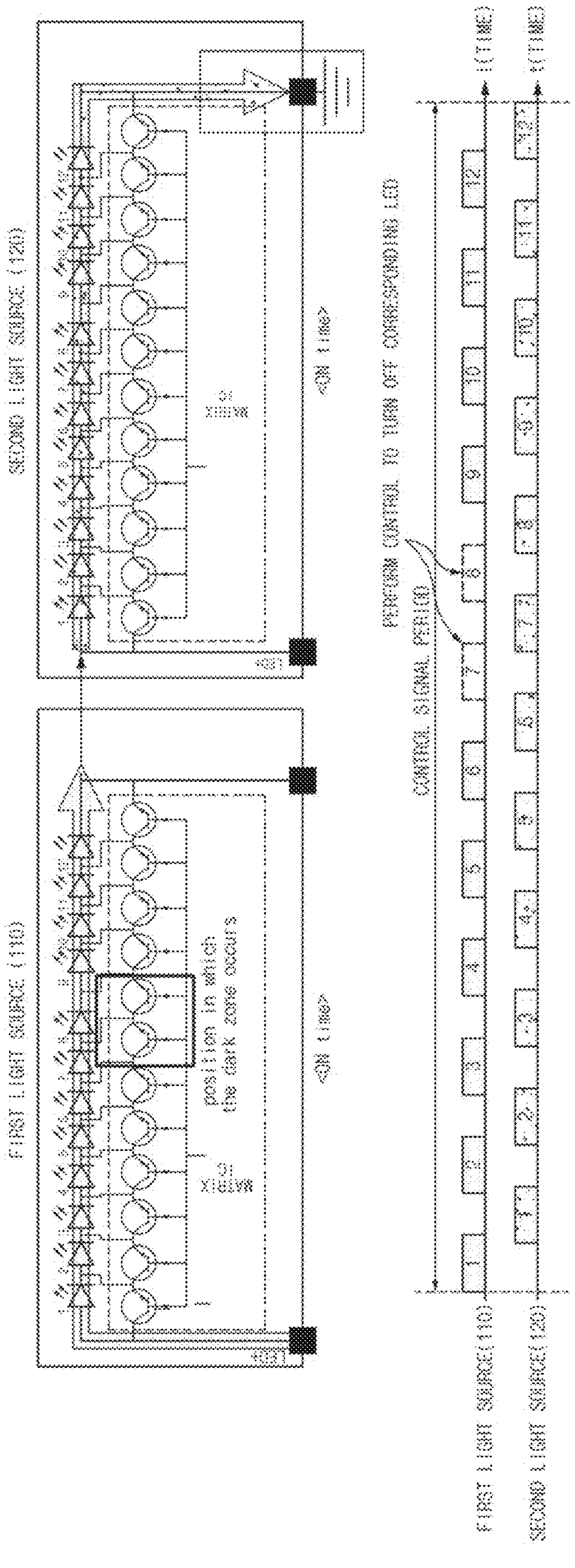
FIG. 11 is a diagram illustrating an example of control according to a control signal generated based on vehicle-related information according to an embodiment disclosed herein.

FIG. 11 is a diagram illustrating an example of control based on a control signal generated based on vehicle-related information according to an embodiment disclosed herein.

Referring to FIG. 11, the signal controller 300 may generate a control signal based on vehicle-related information.

According to an embodiment, the signal controller 300 may receive vehicle-related information. The signal controller 300 may include a communication device (not shown) for obtaining vehicle-related information. The communication device may receive vehicle-related information obtained from various vehicle sensors and the like.

According to an embodiment, the signal controller 300 may generate a control signal based on vehicle-related information. The vehicle-related information may include, for example, dark zone information, lamp steering, vehicle speed, vehicle acceleration, line information, road surface information, and the like. As an example, the signal controller 300 may receive vehicle traveling direction information and generates a control signal for controlling the lighting of the plurality of light sources 100 to correspond to an arrow image to output the arrow image corresponding to the traveling direction.

According to an embodiment, the signal controller 300 may perform control to turn off an LED corresponding to the dark zone information during the on-time of the plurality of light sources 100 based on the dark zone information. The dark zone information may include, for example, information on a region to which an opposing vehicle belongs among light-emitting regions of the plurality of light sources 100. In this case, the signal controller 300 may perform control to turn off an LED corresponding to the dark zone information among the plurality of LEDs such that that light is not emitted toward a dark zone even when the plurality of light sources 100 operate in the on-time.

For example, it can be seen from FIG. 11 that the signal controller 300 performs control to turn off a corresponding LED even though the first light source 110 is in on-time, when the seventh LED and the eighth LED of the first light source 110 belong to a position in which the dark zone occurs based on the dark zone information. In this case, the signal controller 300 may also control a light source having no LED corresponding to the dark zone information, for example, a second light source 120 simultaneously with control of the first light source 110 related with the dark zone.

Figure 12:
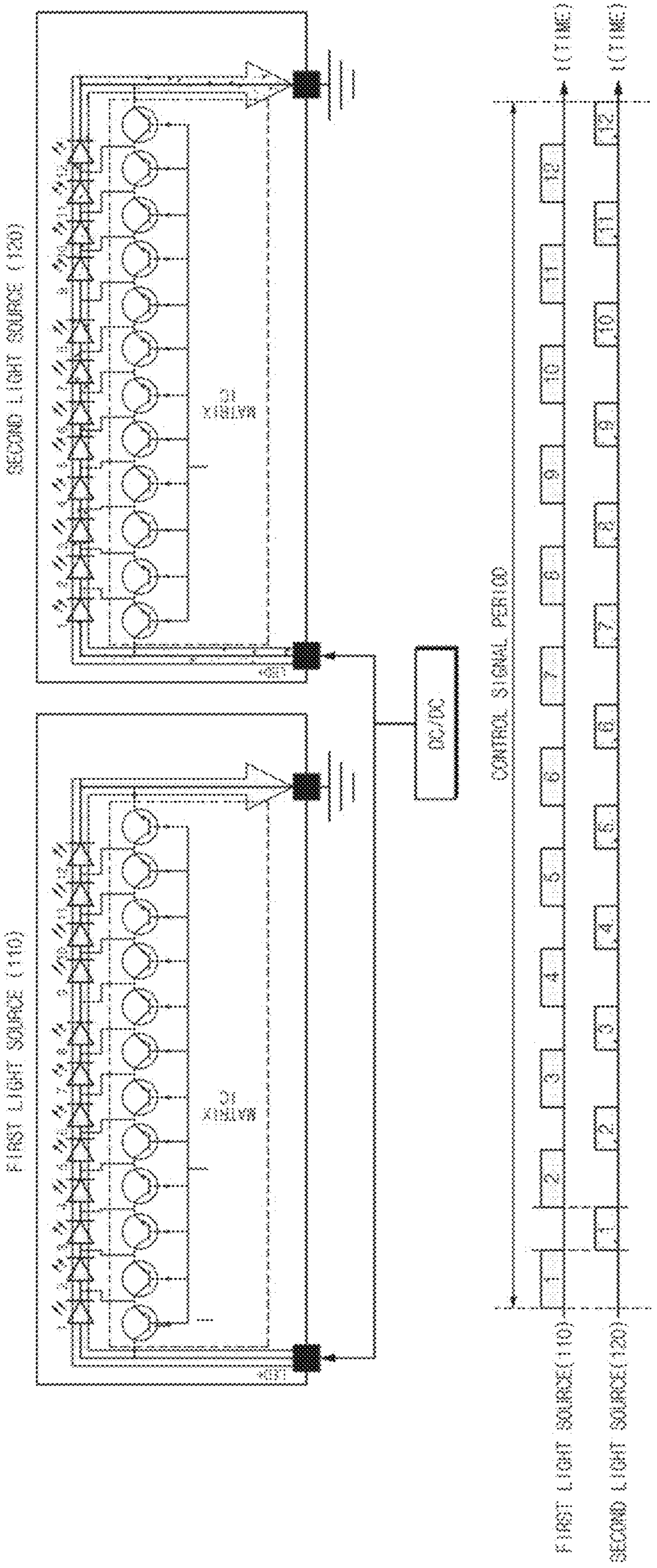
FIG. 12 is a diagram illustrating an example in which a plurality of light sources are connected in parallel according to an embodiment disclosed herein.

FIG. 12 is a diagram showing an example in which a plurality of light sources are connected in parallel according to an embodiment disclosed herein.

According to the embodiment, the plurality of light sources 100 may be connected in parallel to each other. In this case, the signal controller 300 may control the light source controller 200 such that the on-times of the plurality of light sources 100 do not overlap each other. For example, it can be seen from FIG. 12 that the on-times of the plurality of LEDs included in the first light source 110 and the second light source 120 do not overlap each other.

Figure 13:
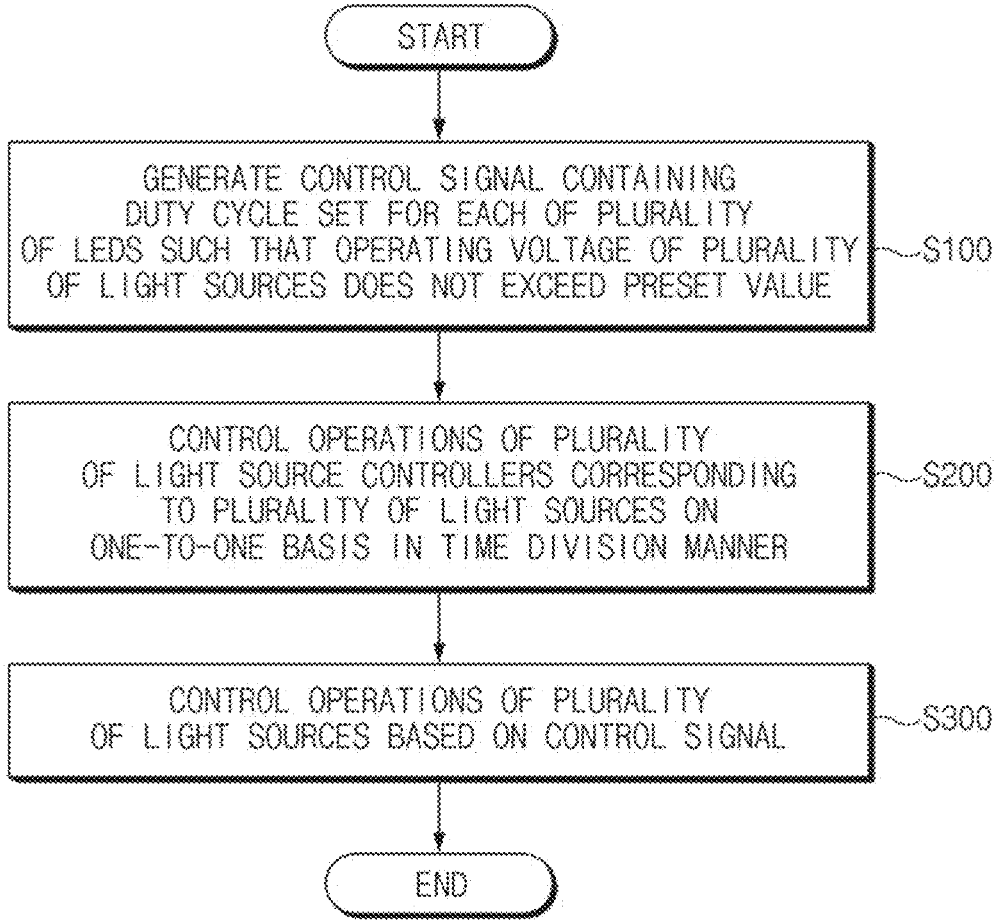
FIG. 13 is a flowchart for describing a method of operating a lamp according to an embodiment disclosed herein.

FIG. 13 is a flowchart for describing a method of operating a lamp according to an embodiment disclosed herein.

Referring to FIG. 13, a lamp control method may include generating a control signal containing a duty cycle set to each of a plurality of LEDs such that an operating voltage of a plurality of light sources does not exceed a preset value (S100), controlling operations of light source controllers corresponding to the plurality of light sources on a one-to-one basis in a time-division manner (S200), and controlling operations of the plurality of light sources based on the control signal (S300).

In step S100, the signal controller 300 may generate a control signal containing a duty cycle set for each of the plurality of LEDs such that the operating voltage of the plurality of light sources 100 does not exceed the preset value.

In step S200, the signal controller 300 may control operations of the light source controllers 200 corresponding to the plurality of light sources 100 on a one-to-one basis in a time-division manner.

In step S300, each of the light source controllers 200 may control an operation of each of the plurality of light sources 100 based on the control signal received from the signal controller 300. In this case, each of the light source controllers 200 may individually control a plurality of LEDs included in each of the plurality of light sources 100 based on the control signal.

All the constructional elements of the embodiments of the present disclosure have been described operating as they are engaged as one element; however the present disclosure is not limited to such embodiments. In other words, within the ranges of the objects of the present disclosure, at least two elements among the above mentioned constructional elements may be selectively engaged and operate. In addition, terms such as "including", "comprising", or "having" described above should be interpreted in default as inclusive or open rather than exclusive or closed unless expressly defined to the contrary. It should be construed as being able to further include other components. All terms, including technical or scientific terms, have the same meaning as commonly understood by a person of ordinary skill in the art to which the embodiments disclosed in this document belong, unless defined otherwise. Generally-used terms as those defined in a dictionary are to be interpreted as having meanings equal to the contextual meanings in the relevant field of art, and are not to be interpreted as having ideal or excessively formal meanings unless clearly defined in the disclosure.

The above description is merely illustrative of the technical idea of the present disclosure, and various modifications and variations may be made without departing from the essential characteristics of the embodiments disclosed herein by those skilled in the art to which the embodiments disclosed herein pertains. Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The lamp according to the embodiments disclosed herein may reduce material costs and reduce the area of a circuit board by optimizing and reducing the number of power supply devices.

In addition, the lamp according to the embodiments disclosed herein may prevent damage to the plurality of light sources and the LEDs constituting the plurality of light sources by controlling the operating voltage of the plurality of light sources not to exceed a preset value.

In addition, the lamp according to the embodiments disclosed herein may maintain a constant amount of light by controlling currents flowing through the plurality of light sources based on the duty ratio.

In addition, the lamp according to the embodiments disclosed herein may prevent damage to the LEDs due to a spike current by adjusting the on-time of each LED.

In addition, the lamp according to the embodiments disclosed herein may protect the LEDs by performing control to stop supplying power to be stopped in the corresponding period of the control signal when an overvoltage occurs.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lamp comprising:

a plurality of light sources connected to one another in series;

a light source controller coupled to the plurality of light sources and configured to control, based on a control signal, each of the plurality of light sources individually; and a signal controller coupled to the light source controller and configured to generate the control signal having a duty cycle set such that an operating voltage of the plurality of light sources does not exceed a preset value to control an operation of the light source controller in a time division manner, wherein the preset value includes a maximum forward voltage value of each of the plurality of light sources.

2. The lamp of claim 1, wherein:

the light source controller comprises a plurality of light source controllers, and the plurality of light source controllers respectively correspond to the plurality of light sources, each light source configured to control the corresponding light source.

3. The lamp of claim 1, wherein the signal controller is configured to:

set a duty ratio of each of the plurality of light sources such that on-times of the plurality of light sources do not overlap each other, and set a duty ratio of transient intervals between the on-times of the plurality of light sources.

4. The lamp of claim 3, wherein the signal controller is configured to control a sum of the duty ratio of each of the plurality of light sources and the duty ratio of each of the transient intervals not to exceed 100%.

5. The lamp of claim 1, wherein the signal controller is configured to control a current flowing through the plurality of light sources based on the duty cycle of the control signal.

6. The lamp of claim 5, wherein the signal controller is configured to perform control such that the current flowing through the plurality of light sources does not exceed a first value.

7. The lamp of claim 1, wherein each of the plurality of light sources includes one LED or a plurality of LEDs connected in series.

8. The lamp of claim 7, wherein the signal controller is configured to receive vehicle-related information and generate the control signal based on the vehicle-related information.

9. The lamp of claim 8, wherein:

the vehicle-related information includes dark zone information, and the signal controller is configured to perform control to turn off an LED corresponding to the dark zone information at an on-time of the plurality of light sources based on the dark zone information.

10. The lamp of claim 7, wherein the signal controller is configured to set a duty ratio for each of the plurality of LEDs of the plurality of light sources and adjust a period of the control signal based on an on-time of each of the plurality of LEDs.

11. The lamp of claim 1, wherein the signal controller is configured to perform control to stop supplying power to the plurality of light sources within a period of the control signal when the operating voltage of the plurality of light sources exceeds a second value.

12. The lamp of claim 1, further comprising a power supply configured to supply power to the plurality of light sources.

13. The lamp of claim 12, wherein:

the power supply includes a first to n-th power supplies, wherein n is a natural number equal to or greater than 2, the plurality of light sources includes a first to n-th light source groups, the first to n-th light source groups are defined such that currents supplied by the first to n-th power supplies do not exceed a third value, and the first to n-th power supplies respectively correspond to the first to n-th light source groups and configured to respectively supply power to the first to n-th light source groups.

14. The lamp of claim 1, wherein the signal controller is configured to control an on/off frequency of the plurality of light sources to be equal to or greater than a fourth value.

15. A lamp comprising:

a plurality of light sources, each light source including a plurality of LEDs connected to each other in series;

a plurality of light source controllers respectively corresponding to to the plurality of light sources, each light source controller configured to control, based on a control signal, the corresponding light sources; and a signal controller configured to generate the control signal having a duty cycle set for each of the plurality of LEDs such that an operating voltage of the plurality of light sources does not exceed a preset value and control the plurality of light source controllers in a time division manner, wherein the preset value includes a maximum forward voltage value of each of the plurality of light sources.

16. The lamp of claim 15, wherein the plurality of light sources is connected to each other in series.

17. The lamp of claim 16, wherein the signal controller is configured to set the duty cycle such that a sum of a number of the plurality of LEDs simultaneously turned on based on the preset value does not exceed a fifth value.

18. The lamp of claim 16, wherein the signal controller is configured to set the duty cycle of each of the plurality of LEDs such that each of the plurality of LEDs of the plurality of light sources is turned on at least once within a period of the control signal.

19. The lamp of claim 16, wherein the signal controller is configured to set a duty ratio of each of the plurality of LEDs within an on-time of each of the plurality of light sources to individually control a current value of each of the plurality of LEDs and a time when each of the plurality of LEDs is turned on or off.

20. The lamp of claim 15, wherein:

the plurality of light sources is connected to each other in parallel, and the signal controller is configured to control the plurality of light source controllers such that on-times of the plurality of light sources do not overlap each other.

* * * * *